Figure 1:
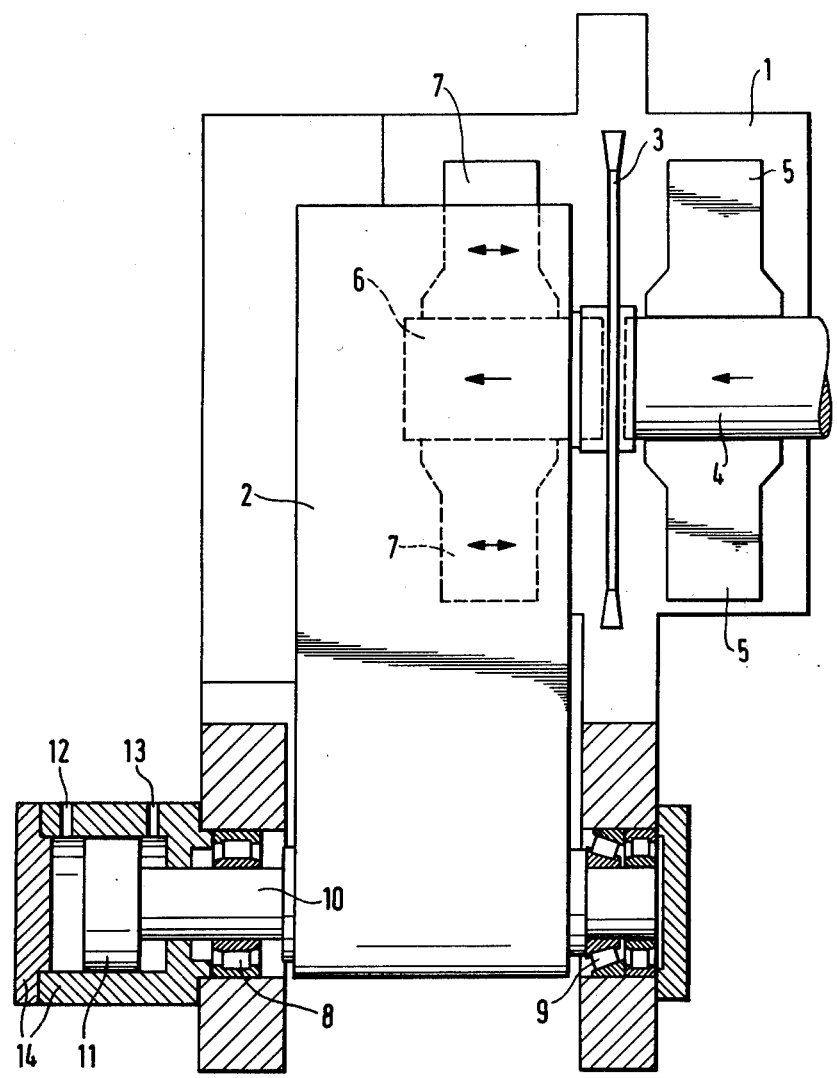

United States Patent [19]

Pieper et al.

[11] 4,289,054
[45] Sep. 15, 1981

[54] CIRCULAR SAW WITH MEANS FOR OPENING UP THE CUT SLIT

[75] Inventors: Paul Pieper; Walter Cordier, both of Menden, Fed. Rep. of Germany

[73] Assignee: Rolf Peddinghaus, Ennepetal, Fed. Rep. of Germany

[21] Appl. No.: 71,282

[22] Filed: Aug. 30, 1979

[30] Foreign Application Priority Data

Sep. 5, 1978 [DE] Fed. Rep. of Germany ....... 2838656

[51] Int. Cl.³ ............................................ B23D 45/04
[52] U.S. Cl. ...................................... 83/113; 83/216; 83/483; 83/490; 83/556
[58] Field of Search ............. 83/113, 216, 217, 471.2, 83/469, 483, 490, 554, 556

[56] References Cited

U.S. PATENT DOCUMENTS

| | | | |
|---|---|---|---|
| 1,033,454 | 7/1912 | Pagelsen | 83/318 X |
| 1,726,256 | 8/1929 | Buttner | 83/318 |
| 2,262,619 | 11/1941 | Morris | 83/318 X |
| 3,572,200 | 3/1971 | Allison et al. | 83/318 X |
| 3,709,075 | 1/1973 | Goellner | 83/113 X |
| 3,752,023 | 8/1973 | Allison et al. | 83/113 X |
| 3,878,744 | 4/1975 | Luxnat | 83/113 X |

*Primary Examiner*—J. M. Meister
*Attorney, Agent, or Firm*—Dressler, Goldsmith, Shore, Sutker & Milnamow, Ltd.

[57] ABSTRACT

A cutting tool arrangement for performing the process of opening up the slit cut in the workpiece by circular saws before the saw is retracted to facilitate removal of the saw. The workpiece being severed is moved perpendicular to the cutting plane as is the saw blade to accomplish the desired result.

12 Claims, 3 Drawing Figures

CIRCULAR SAW WITH MEANS FOR OPENING UP THE CUT SLIT

The invention relates to a cutting tool arrangement for use in the process of opening up the slit, cut in workpieces by circular saws, before the retraction of the saw blade and after the sawing step.

A process of this type serves to protect the saw blade from unnecessary wear which would occur if the saw blade were retracted again through the cut slit which has just been sawn. For this purpose, the severed part of the workpiece is moved away perpendicular to the plane of cutting and the saw spindle together with the saw blade is then laterally displaced in the same direction, but not to the same extent.

In conventional processes, opening up of the cut slit is achieved in such a way that, on the one hand, the clamping, such as a chuck holder, for the severed part of the workpiece is moved away from the saw blade, parallel to the axis of rotation of the saw blade, by means of a pulling device and that, on the other hand, the saw blade together with the saw spindle in its bearings in the drive housing is then axially shifted by the requisite distance.

A disadvantage of this procedure is that, for displacing or shifting the saw spindle, a displaceable rotary connection between the saw spindle and the corresponding associated shifting device is required, as a result of which the drive mechanism of the saw must be of an extremely complicated design in order to be able to ensure vibration-free running of the saw blade.

It is the object of the invention to provide a process for opening up the cut slit and a circular saw for carrying out the process, wherein direct transmission of the drive power is made possible while avoiding this disadvantage.

According to the invention, this object is achieved by laterally displacing the drive housing of the disc saw together with the saw spindle and the saw blade as a whole.

Opening up of the cut slit is thus effected in such a way that the part of the workpiece, which has been sawn off, is laterally displaced by a certain distance and the entire drive mechanism of the saw together with the saw blade is then displaced or shifted in the same direction with the aid of sequence control, for example by half this distance. Moreover, as a result of the invention, the stress in the bearings is considerably reduced by uncoupling the axial movement and the circumferential movement of the saw spindle.

In circular saws or machine saws, in which the drive mechanism of the saw is accommodated in a swivel arm, this axial displacement in the mounting of the swivel arm can be carried out in a simple manner, preferably hydraulically.

A particular advantage is here that a special design for the drive mechanism is not necessary, but that instead this can be constructed in a manner which is as simple as is determined solely by the sawing step.

Figure 2:
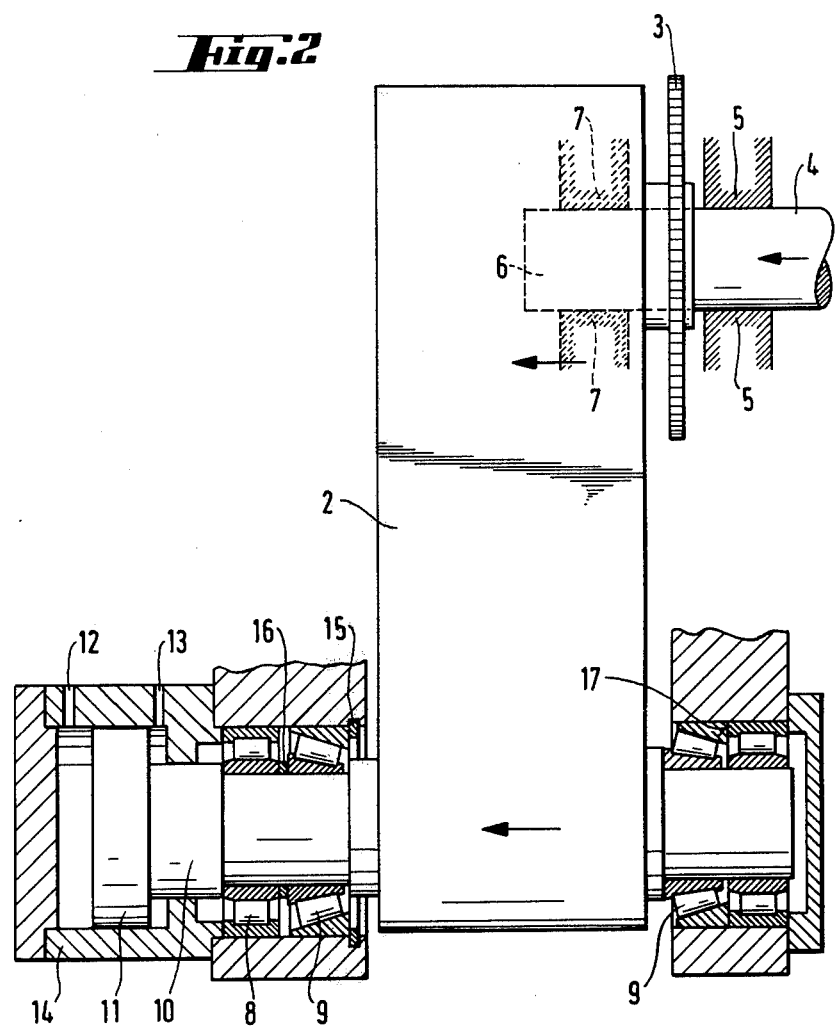
Figure 3:
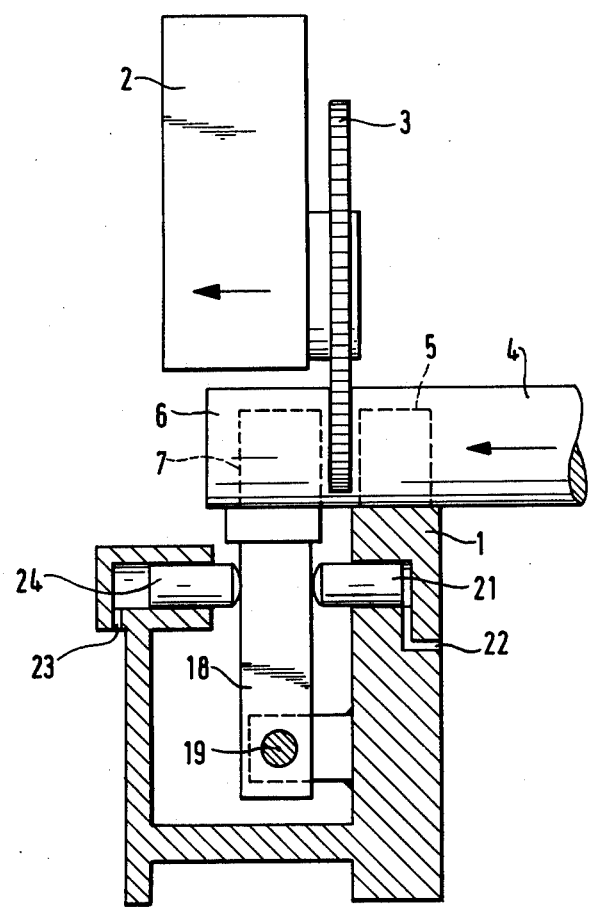

The invention is explained in more detail by reference to the illustrative embodiments shown in the drawing in which:

FIG. 1 diagrammatically shows a plan view and a partial section of a first illustrative embodiment of the invention, FIG. 2 shows a plan view, similar to FIG. 1, of a second illustrative embodiment of the invention, and FIG. 3 shows a side view, in partial section, of a special clamping device for the parts of the workpiece.

FIGS. 1 and 2 show a plan view of a part of the machine saw or circular saw, having a saw table 1 and a swivel arm 2 which contains the drive for a saw blade 3. A part of material or workpiece 4 fed in is held by clamping jaws 5, whilst the part 6 of the workpiece, which is to be cut off, is clamped and held by laterally displaceable clamping jaws 7 and can be moved laterally after it has been severed.

The swivel arm 2 is here mounted on the hydraulic cylinder side in a journal bearing 8, for example, a cylindrical roller bearing, and is mounted on the saw blade side in a journal bearing and a conical roller bearing 9, or it is mounted on both sides in both the types of bearing (FIG. 2).

The hydraulic cylinder for shifting the swivel arm 2 has a piston 11 which engages on the bearing shaft 10 of the swivel arm 2 and is laterally displaceable in a housing 14, specifically by introducing a hydraulic fluid either via a cylinder opening 12 or a cylinder opening 13, which are located in the housing 14 on either side of the piston 11.

During the sawing step, the piston 11 is subject to a constant pressure as a result of the introduction of hydraulic fluid via the opening 12. This pressure on the piston 11 is transmitted via the shaft 10 to at least one conical roller bearing 9, which is supported on parts 15,16,17, in such a way that an axial distortion of the conical roller bearings 9 relative to the saw table 1 is obtained, as a result of which radial mounting without play is achieved. In this way, the saw arm 2 is mounted absolutely without play so that a vibration-free or oscillation-free sawing step can be achieved, which is a very substantial advantage in sawing.

FIG. 3 shows the device for clamping the work part. The workpiece 4 is introduced in the direction of the arrow, while the saw is swivelled up or the swivel arm 2 is swivelled up, and is clamped in before the sawing step by means of the clamping jaws or chuck jaws 5 or 7, which are located on either side relative to the cutting slit which is to be sawed. The clamping jaw 7 is fixed to a swivel arm 18 which is mounted to be pivotable about a pivot point 19 relative to the saw table 1. Before sawing, the clamping jaws 7 are actuated in their end position on the right-hand side (FIG. 3), that is to say in their position nearest to the clamping jaws 5, in order to clamp in the workpiece 4. After the step of chucking or clamping the workpiece 4 has been carried out on either side of the saw blade 3, a piston 21 in the saw table 1 is subjected via a channel 22 to the constant pressure of a hydraulic fluid. This pressure force is transmitted to the clamping jaws 7, as a result of which a pre-tension of the section of material or of the part 6 of the workpiece, which is to be severed, is obtained during the sawing step.

After the part 6 of the workpiece has been severed, the latter is still held by the clamping jaws and is moved laterally, that is to say to the left in FIG. 3, away from the saw blade 3 by means of the piston 21 due to the pressure of the hydraulic fluid in the channel 22; this results in the cutting channel being opened up.

By means of sequence control, the saw blade housing, that is to say in the present case the swivel arm containing the arm 7 of the saw blade, as shown in FIGS. 1 and 2, is then laterally displaced in the same direction, that is to say to the left in FIG. 3; in other words, the saw drive mechanism including the saw blade 3 is moved away by a few millimeters from the cutting point of the workpiece 4 which is clamped in between the clamping jaws 5. The swivel arm 2, together with the saw blade 3, can now be swivelled upwards into the starting position. The clamping jaws 7 then release the part 6 of the workpiece, which has been sawn off. A further sawing step or further cutting step can then be triggered by appropriate feeding of the workpiece 4.

For this purpose, the swivel arm 18 is returned into the starting position by means of a piston 24 as a result of subjecting it to the pressure of a hydraulic fluid in passage 23, the channel 22 being relieved at the same time.

The essential point of the invention is that the cut slit is opened up reliably and perfectly before the return stroke of the saw blade 3. This is assisted by the fact that, due to the swivel movement of the swivel arm 18, the clamping jaws 7 prevent contact of the part 6 of the workpiece, which has been cut off, with the saw blade 3 without further external influence, as a result of the heavy weight or of an inward-tilting motion, even if the saw blade is likewise displaced in the same direction.

Since the swivel movements and displacement movements and, if appropriate, also the clamping movements are effected hydraulically, sequence control of a simple design can be achieved.

We claim:

1. An improved cutting tool arrangement for cutting a workpiece comprising:
   a movable saw blade,
   drive means for moving said saw blade,
   arm means for supporting said saw blade and said drive means and for effecting transverse movement of the saw blade relative to the workpiece to cut the workpiece into two portions and for effecting retraction of the saw blade relative to the workpiece,
   means for effecting movement of one of said workpiece portions away from the other workpiece portion,
   displacement means for displacing said arm means laterally of said transverse movement and for moving said saw blade away from the other workpiece portion, and
   sequencing means for activating said displacement means after said one portion has moved away from said other portion, whereby said arm means are displaced before said saw blade is retracted to reduce contact of said saw blade with the other workpiece portion during retraction.

2. The cutting tool arrangement as recited in claim 1, wherein
   said arm means includes pivot means for pivoting said saw blade in an arc defining a plane extending generally perpendicular to said workpiece.

3. The cutting tool as recited in claim 2, wherein said displacement means is aligned with and acts coaxially of the pivot axis of said pivot means.

4. The cutting tool as recited in claim 1 or 3, wherein, said displacement means comprise a fluid actuator.

5. The cutting tool arrangement as recited in claim 1 or 3 wherein
   said means for effecting movement of said one workpiece portion maintains said workpiece in tension during the cutting of the workpiece by the saw blade.

6. The cutting tool arrangement as recited in claim 5, wherein
   said means for effecting movement comprises swivel means for pivoting said one workpiece portion relative to said other workpiece portion.

7. The cutting tool arrangement as recited in claim 6, and
   said swivel means including fluid actuator means for effecting said pivoting.

8. The cutting tool arrangement as recited in claim 3, wherein
   said pivot means includes thrust bearing means for accommodating displacement of said arm means by said displacement means.

9. An improved cutting tool arrangement for cutting a workpiece comprising:
   a rotatable circular saw blade,
   drive means for rotating said blade,
   swivel arm means for supporting said saw blade and said drive means for pivoting movement about a pivot axis parallel to the axis of rotation of said saw blade, said arm means being pivotal for effecting cutting of said workpiece into two portions by said saw blade and for retracting said saw blade from said workpiece,
   clamp means for gripping one of said portions and for moving said one portion away from said other portion, and
   displacement means for displacing said swivel arm means axially of said pivot axis and away from said other portion after said one portion is moved and prior to said swivel arm means retracting said saw blade from said workpiece.

10. The cutting tool arrangement as recited in claim 9, wherein
    said displacement means are disposed such that said swivel arm is displaced in generally the same direction as said clamp means move said one portion.

11. The cutting tool arrangement as recited in claim 9, and
    pivot means for pivotally mounting said clamp means for movement about a clamp pivot axis perpendicular to said pivot axis,
    said clamp means maintaining said workpiece in tension during cutting by said saw blade.

12. The cutting tool arrangement as recited in claims 9 or 11, and
    hydraulic means for reversibly actuating said clamp means and said displacement means.

* * * * *